(12) United States Patent
Beaven et al.

(10) Patent No.: US 6,675,321 B1
(45) Date of Patent: Jan. 6, 2004

(54) DATA PROCESSING APPARATUS, METHOD AND COMPUTER PROGRAM WITH OPTIMIZED KEY-POINTING OPERATION FOR LOG RECORD STORAGE

(75) Inventors: John Anthony Beaven, Romsey (GB); Amanda Elizabeth Chessell, Alton (GB); Martin Mulholland, Winchester (GB); David John Vines, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/449,401

(22) Filed: Nov. 26, 1999

(30) Foreign Application Priority Data

Nov. 26, 1998 (GB) .............................. 9825785

(51) Int. Cl.$^7$ .............................................. G06F 11/00
(52) U.S. Cl. ...................... 714/20; 707/206; 711/165
(58) Field of Search ...................... 714/15, 18, 19, 714/20; 707/202, 206; 711/165

(56) References Cited

U.S. PATENT DOCUMENTS

| | | | | |
|---|---|---|---|---|
| 5,245,615 A | * | 9/1993 | Treu | 714/3 |
| 5,544,359 A | * | 8/1996 | Tada et al. | 707/202 |
| 5,692,185 A | * | 11/1997 | Nilsen et al. | 707/104.1 |
| 5,796,934 A | * | 8/1998 | Bhanot et al. | 714/15 |
| 5,850,507 A | * | 12/1998 | Ngai et al. | 707/202 |
| 5,933,840 A | * | 8/1999 | Menon et al. | 707/205 |
| 6,055,604 A | * | 4/2000 | Voigt et al. | 710/52 |
| 6,286,011 B1 | * | 9/2001 | Velamuri et al. | 707/10 |
| 6,286,088 B1 | * | 9/2001 | Campbell et al. | 711/100 |
| 6,397,311 B1 | * | 5/2002 | Capps | 709/1 |
| 6,604,183 B2 | * | 8/2003 | Beaven et al. | 711/165 |

* cited by examiner

*Primary Examiner*—Robert Beausoliel
*Assistant Examiner*—Marc Duncan
(74) *Attorney, Agent, or Firm*—Ronald L. Drumheller

(57) ABSTRACT

A data processing apparatus has a direct access non-volatile memory storage device having a plurality of extent files for storing log records therein; an allocating unit for allocating a current extent file to be used for storing log records; a writing unit for writing log records into the current extent file until the current extent file cannot store any further log records; and a key-pointing unit for performing a key-pointing operation on the written log records when the writing unit has reached the point where no further log records can be stored in the current extent file.

9 Claims, 2 Drawing Sheets

DATA PROCESSING APPARATUS, METHOD AND COMPUTER PROGRAM WITH OPTIMIZED KEY-POINTING OPERATION FOR LOG RECORD STORAGE

FIELD OF THE INVENTION

The present invention relates to data processing, and particularly to a maintenance mechanism for organizing data which has been previously stored on a storage medium during a data processing operation.

BACKGROUND OF THE INVENTION

In certain data processing operations it is useful to maintain a log file related to ongoing data processing activity. For example, in the transaction processing field, it is common to maintain a log file of ongoing transactions involving a particular data processing apparatus so that if the data processing apparatus should fail for some reason (e.g., power failure) the log file can be used to recover the data processing apparatus back to the state it was in, with respect to processing the transactions, before the failure. This is a very important consideration because the business world depends on the processing of transactions to be tolerant of system failures in order to maintain the integrity of mission critical data which is involved in the transactions.

Such log files are typically maintained on a direct access non-volatile storage device (such as a hard disk drive) so that the data will not be lost in case of a power failure. As the data processing apparatus processes ongoing transactions, log records containing information pertaining to the ongoing transactions are written into files (called hereinafter "extent" files) in the non-volatile storage device. These log records would thus be retrieved from the extent files to reconstruct the transaction processing environment within the data processing apparatus in the event of a failure and a subsequent recovery from such failure.

The size of an extent file can be configured by the operator and log records are written to an extent file up to the configured size, at which point a new extent file is created in order to store more log records. It is often the case that an extent file is very large as compared to a log record, and thus many log records are stored in a single extent file. Special "link" records are used to link one extent file to the next. A spare extent file known as a "cushion" file is also pre-allocated. This cushion file can be used as an extent file instead of creating a new extent file in the event that the log runs short on disk storage.

Eventually, the stored log records will become unnecessary. For example, in transaction processing, when a transaction has completed there is no longer a need for the data processing apparatus to store the log records for that transaction since there is no longer a need for that transaction to be taken into account in the event of the apparatus recovering from a failure. It is clear that if the amount of data written to the log is DW, then there will be a value DA which represents the data associated with active transactions, such that DA is less than or equal to DW.

While a transaction processing operation is progressing, it is thus useful to carry out a maintenance operation called "key-pointing" the log, which involves rewriting all active data (DA) to the log as follows:
1) write a key-point start record to the log
2) rewrite all active data (DA)
3) write a key-point end record to the log
While the key-pointing operation is being carried out, concurrent accesses to the log for other purposes (updating, reading etc.) are blocked. Via the key-pointing operation, the log file is re-organized such that all of the active data (DA) is stored in log records between the key-point start record and the key-point end record. This means that all extent files which logically come prior to the extent file which contains the key-point start record can be deleted. Because DA<DW if we have ended one or more transactions, the amount of data in the log will be reduced to a minimum and we can manage the overall size of the transactions log file.

A decision is required as to the best point at which to key-point the log. If the key-pointing is done too often, the result will be a reduction in the performance of the data processing apparatus, since the apparatus will be spending too much time key-pointing. On the other hand, if the key-pointing operation is carried out too infrequently, the log will accumulate extent files unnecessarily.

IBM Corp. has a software product called Component Broker which has a transaction service which performs a key-point operation of a transactions log file for every 100 transactions that are executed. It is not clear whether this is the best point at which to carry out the key-point operation. For example, if the extent file size is large enough to accommodate the log records for several hundred transactions, the key-point pattern will be of the form:

1) Perform a number of key-points within a single extent file. But these multiple key-points will consume much processing time, as the processing apparatus is blocked from doing log writes associated with transactional activity while the key-pointing operation is being carried out.

2) Perform a key-point operation which runs over into a new extent file. This key-point will not allow the removal of the first extent file (as the key-point start record remains within the first extent file) and therefore much file space will be unnecessarily consumed.

IBM's CICS transaction processing software product ("CICS" is a trademark of the IBM Corp.) performs key-pointing after a configurable number of log write operations has been carried out. However, as the amount of data in each write can vary widely, the same inefficiencies pointed out above can also occur with this type of key-pointing.

Thus, the current state of the art with respect to the triggering of the key-pointing operation in a data processing environment employing log files is highly inefficient as too much processing time and file space is expended. There is a strong need in the art for a more efficient result.

SUMMARY OF THE INVENTION

According to a first aspect, the present invention provides a data processing apparatus comprising: a direct access non-volatile memory storage device having a plurality of extent files for storing log records therein; allocating means for allocating a current extent file to be used for storing log records; writing means for writing log records into the current extent file until the current extent file cannot store any further log records; and key-pointing means for performing a key-pointing operation on the written log records when the writing means has reached the point where no further log records can be stored in the current extent file.

According to a second aspect, the present invention provides a computer program product stored on a computer readable storage medium for running on a data processing system, the data processing system having a direct access non-volatile memory storage device having a plurality of extent files for storing log records therein, the program product for carrying out the following steps when run on the data processing system: allocating a current extent file to be used for storing log records; writing log records into the current extent file until the current extent file cannot store any further log records; and performing a key-pointing operation on the written log records when the writing means has reached the point where no further log records can be stored in the current extent file.

According to a third aspect, the present invention provides a data processing method being carried out on a data processing system, the data processing system having a direct access non-volatile memory storage device having a plurality of extent files for storing log records therein, the method having steps of: allocating a current extent file to be used for storing log records; writing log records into the current extent file until the current extent file cannot store any further log records; and performing a key-pointing operation on the written log records when the writing means has reached the point where no further log records can be stored in the current extent file.

Since the triggering of the key-pointing operation occurs when a new extent file is allocated, an optimal timing for key-pointing is achieved which saves greatly on file space and processing cycles. Specifically, since key-pointing takes place in the newly allocated extent file, the previous extent file can be deleted without losing active data, thus freeing up file space. Further, a considerable savings in processing cycles is attained since the frequency of key-pointing is reduced when extent files are large in size, because no key-pointing will take place until a new extent file is prepared for the writing of log records therein.

BRIEF DESCRIPTION OF THE DRAWINGS

A preferred embodiment of the present invention will now be described by making reference to the following drawing figures.

DETAILED DESCRIPTION OF THE PREFERRED EMBODIMENTS

Figure 1:
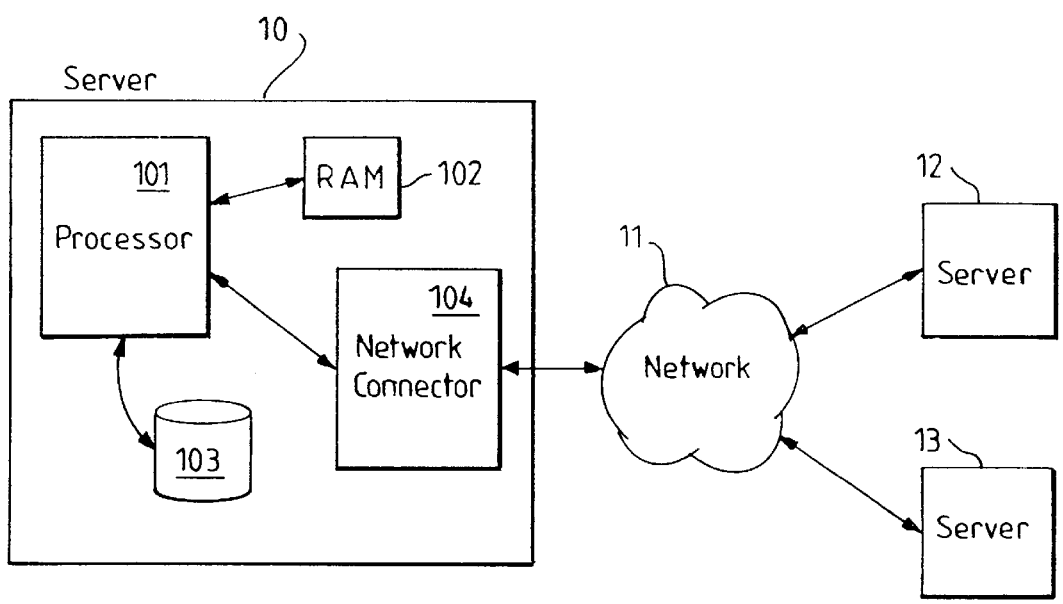
FIG. 1 is a block diagram of a data processing environment in which the preferred embodiment of the present invention can be advantageously applied.

In FIG. 1, a server data processing apparatus 10 is connected to other server data processing apparatuses 12 and 13 via a network 11, which could be, for example, the Internet. The servers 10, 12 and 13 interact which each other, in the preferred embodiment, to carry out the processing of transactions (e.g., updates to bank accounts). Server 10 has a processor 101 for controlling the operation of the server 10, a RAM volatile memory element 102 for temporarily storing data concerning the transactions that are being carried out, a non-volatile memory 103 for also storing such data so that the transactions can be recovered in case of a server failure, and a network connector 104 for use in interfacing the server 10 with the network 11 so that the server 10 can communicate with the other servers 12 and 13 in the processing of transactions. It should be noted that a network of servers is shown in the preferred embodiment but in other embodiments the server 10 could be operating alone in processing transactions without interacting with other servers.

Figure 2:
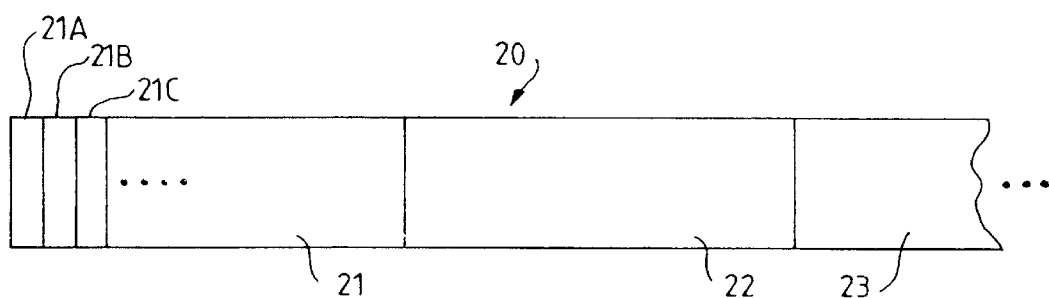
FIG. 2 shows the structure of a log file with which the preferred embodiment of the present invention can be used.

The structure of the transactions log file, stored in the non-volatile storage 103, is shown in FIG. 2. The log file 20 is broken up into extent files 21, 22, 23, which are of equal size in the preferred embodiment but which can be of different sizes in other embodiments. Taking extent file 21 as an example, log records 21A, 21B and 21C are stored in the extent file 21 as the server 10 processes transactions. Should the server 10 experience a failure (e.g., a power loss), upon recovering, the server 10 uses this log file 20 to recreate the transaction processing environment that existed prior to the failure, as was discussed above.

The processor 101, in the preferred embodiment, allocates extent files 21, 22 to be used in storing log records in the log file 20. The processor 101 first allocates a first extent file 21 and as the server 10 participates in the processing of transactions, log records 21A, 21B, 21C etc. are stored in the first extent file 21 (see step 31 of the flowchart of FIG. 3). At step 32, the processor 101 determines whether the presently allocated extent file 21 has been completely written with log records (that is, is there further room for more log records to be written into the current extent file). If the current extent file still has more room for further log records to be written, control flows back to step 31 where further log records are stored in extent file 21. However, if it is determined that the current extent file 21 can not store any further log records, control flows to step 33 where the processor 101 allocates a new extent file 22 to be used in storing log records. Then, control flows to step 34 where the processor 101 begins a key-point operation on the log file 20, and after the key-point operation finishes, control flows back to step 31 where further log records are stored in the extent file 22.

A brief description of the key-pointing operation, in conjunction with the preferred embodiment of the present invention, will now be described with reference to FIG. 4.

Figure 3:
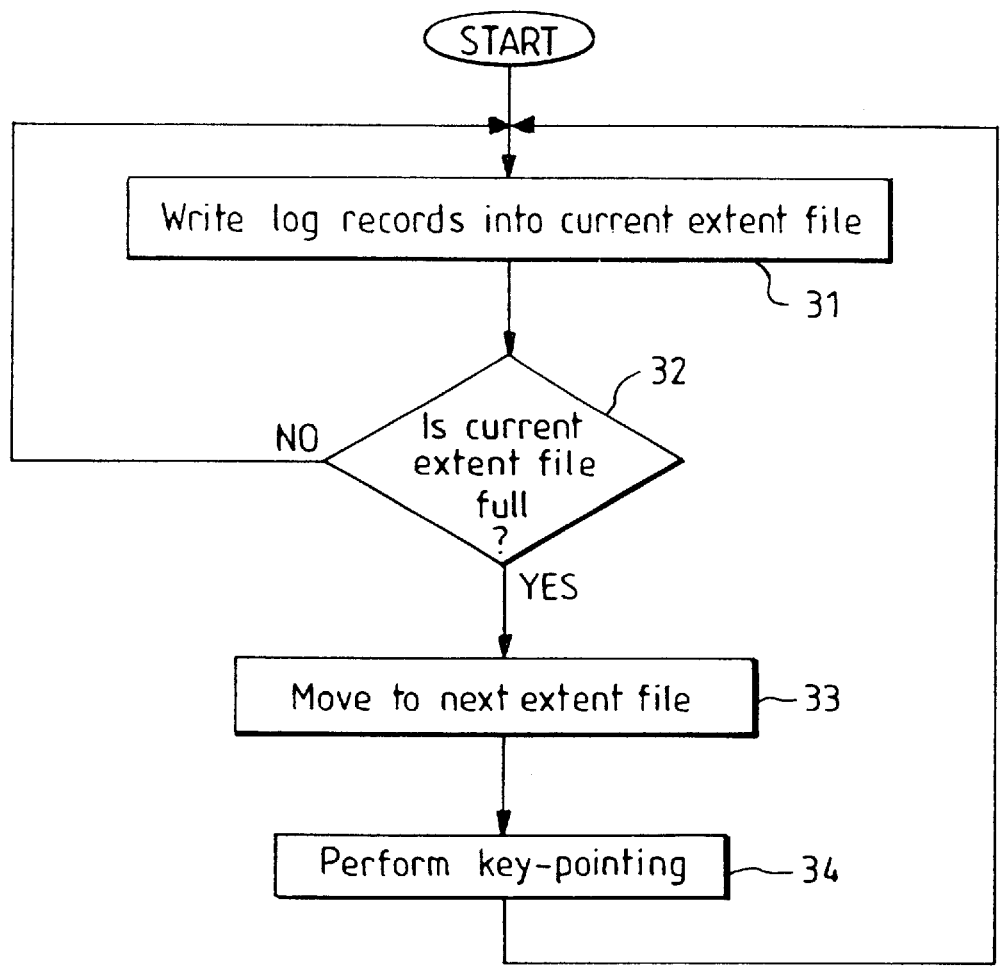
FIG. 3 is a flowchart showing the processing steps involved within a data processing apparatus, according to a preferred embodiment of the present invention.
Figure 4:
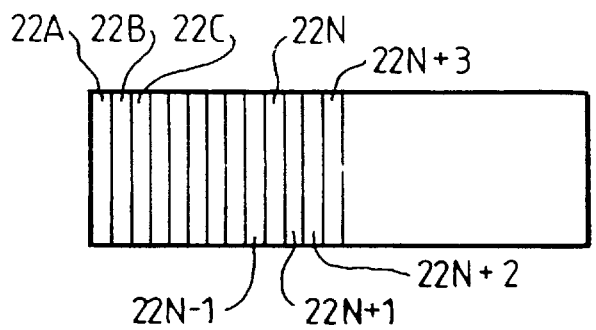
FIG. 4 shows a log extent file during the key-pointing operation, according to a preferred embodiment of the present invention.

FIG. 4 shows the extent file 22 of FIG. 2 during the key-pointing operation which takes place at step 34 of FIG. 3. Importantly, the key-pointing operation is taking place in a newly allocated extent file that is free to have log records written thereto. This should be contrasted with the prior art in which key-pointing took place within an extent file which is also used to hold log records that the key-pointing operation will act upon. In the preferred embodiment of the present invention, at the beginning of the key-pointing operation, a key-point start record 22A is written as the first log record in the new extent file 22. Then, all of the active log records from extent file 21 are stored in the subsequent log records 22B, 22C up to 22N−1. Then, a key-point end record 22N is written. Then, control flows back to step 31 where the subsequent log records 22N+1, 22N+2, 22N+3, etc., are used to store additional data for transactions.

Once the key-pointing operation has been carried out, the extent file 21 can now be deleted since any active data in this extent file has been rewritten by the key-pointing operation into the new extent file 22. This presents a considerable savings in log file space, since the entire extent file 21 can now be deleted and thus freed up for further use. Also, a considerable savings in processor activity is realized by the present invention because the key-pointing operation occurs quite infrequently if the size of the extent file is large (thus allowing the processor to spend its processing time on other things besides repetitive maintenance tasks such as key-pointing).

When an extent file becomes redundant as the result of a key-point operation, instead of deleting the extent file, the extent file could be converted into the cushion file in the event that the cushion file has already been used by the log. The key-point operation will now guarantee the removal of at least one extent file. Thus, unless the size of DA approaches the size of an extent file (a condition that can be avoided by tuning the size of the extent files prior to server deployment) it is now possible to continuously run the logger with enough space for only one extent file and one cushion file. Clearly, if the size of DA did approach the size of an extent file, the key-point operation may require more space than is available in the cushion file, thus causing the log to run out of space.

It is assumed, in the preferred embodiment, that the size of the active data (DA) associated with running transactions is considerably smaller than the size of an extent file. Thus, once the key-pointing operation is carried out at step 34 in the new extent file 22 that was allocated at step 33, there will still be room left for storing more log records when the control flows back to step 31. However, if this assumption is not true and the key-pointing operation results in the entire new extent file 22 being used up by the rewriting of the active data DA, then another extent file would be allocated by the processor 101 prior to control flowing back to step 31.

According to the preferred embodiment of the present invention as described above, the key-pointing operation at step 34 is triggered when a new extent file is allocated. However, in another embodiment, the key-pointing operation could be triggered when a first log record is written into the newly allocated extent file 22. As a practical matter, however, the key-pointing operation is triggered as soon as possible after one of these two events occurs as the design of the code permits. Thus, broadly stated, the key-pointing occurs when no further log records can be written into a current extent file.

We claim:

1. A data processing apparatus comprising:
   a direct access non-volatile memory storage device having a plurality of extent files for storing log records therein;
   allocating means for allocating a current extent file to be used for storing log records;
   writing means for writing log records into the current extent file until the current extent file cannot store any further log records; and
   key-pointing means for performing a key-pointing operation on the written log records when the writing means has reached the point where no further log records can be stored in the current extent file.

2. The apparatus of claim 1 wherein the apparatus further comprises means for deleting an extent file after the key-pointing operation is completed.

3. The apparatus of claim 1 wherein the apparatus further comprises means for converting an extent file into a cushion file after the key-pointing operation is completed.

4. The apparatus of claim 1 wherein the log records represent transactional data necessary to recover the transactional environment that existed in the apparatus prior to an apparatus failure.

5. The apparatus of claim 1 wherein the key-point operation is carried out by writing a key-point start record in an extent file subsequent to said current extent file.

6. The apparatus of claim 5 wherein the key-pointing operation is further carried out by writing active data from said current extent file after said key-point start record.

7. The apparatus of claim 6 wherein the key-pointing operation is further carried out by writing a key-point end record after said active data.

8. A computer program product stored on a computer-readable storage medium for running on a data processing system, the data processing system having a direct access non-volatile memory storage device having a plurality of extent files for storing log records therein, the program product for carrying out the following steps when run on the data processing system:
   allocating a current extent file to be used for storing log records;
   writing log records into the current extent file until the current extent file cannot store any further log records; and
   performing a key-pointing operation on the written log records when the writing means has reached the point where no further log records can be stored in the current extent file.

9. A data processing method being carried out on a data processing system, the data processing system having a direct access non-volatile memory storage device having a plurality of extent files for storing log records therein, the method having steps of:
   allocating a current extent file to be used for storing log records;
   writing log records into the current extent file until the current extent file cannot store any further log records; and
   performing a key-pointing operation on the written log records when the writing means has reached the point where no further log records can be stored in the current extent file.

* * * * *